Patented Dec. 21, 1948

2,456,996

UNITED STATES PATENT OFFICE 2,456,996

DEHYDRATION OF HYDROXYLATED OILS

John B. Rust, East Hanover, N. J., assignor, by direct and mesne assignments, of one-half to Montclair Research Corporation, a corporation of New Jersey, and one-half to Ellis-Foster Company, a corporation of New Jersey No Drawing. Application August 31, 1946, Serial No. 694,411

4 Claims. (Cl. 260—405.5)

This invention relates to the production of a low viscosity drying oil by heating a hydroxylated glyceride such as castor oil with a mixture of boric acid and phosphoric acid or compounds thereof, which react to form a boron phosphate. The reaction with the oil is one of dehydration. An object is to convert a hydroxylated non-drying oil into a light-colored drying oil of low viscosity by a simple procedure, the drying oil thus obtained being capable of use in paints and varnishes having fast dry, light color and good water and alkali resistance. The oil is capable of bodying rapidly and may be polymerized or blown if desired.

The action of phosphoric acid or of boric acid alone on castor oil is known. Boric acid produces oils of very high viscosity but of light color. Phosphoric acid produces oils of medium viscosity but of relatively dark color. Both products have drying properties but the drying rate is relatively low. Therefore, it is unexpected that a mixture of boric acid and phosphoric acid should lead to the radically different results shown herein. Whatever may be the explanation, it is to be noted that the dehydration of castor oil by the conjoint action of boric acid and phosphoric acid produces a different effect than the separate acids, probably on account of the formation of a boron phosphate. This difference is shown in the following experiments.

Four 200-gram portions of castor oil were heated to 250° C. during 15 minutes and held at or about this temperature for 45 minutes. Different dehydration agents were added to each:

A—6 gm. boric acid.
B—6 gm. 85% orthophosphoric acid.
C—3 gm. boric acid and 3 gm. 85% phosphoric acid.
D—6 gm. boron phosphate BPO$_4$ (formed by mixing 23 gm. 85% phosphoric acid and 12.4 gm. boric acid and heating at red heat for 3 hours according to the directions of Vogel, Zeit. Chem., (2) 6, 125, (1870).

Products C and D were hazy and were clarified by filtration. Comparison of the final products showed the following:

| Product | Color (Lovibond) | Viscosity (Gardner) | Drying Time, hours |
|---|---|---|---|
| A | 0.2Y | gel | 195 |
| B | 2% in benzene=7Y | M | 168 |
| C | 2Y | G | 5.5 |
| D | 8Y | E-F | 6.5 |

The drying time given above is for the oils with 0.25% Pb and 0.05% Mn added as naphthenates.

A distinguishing characteristic of the dehydrated oils of this invention is that, whereas many catalysts lead to products which are fast-drying only after polymerization to a high viscosity, the products herein described dry rapidly while being of low viscosity. Furthermore, polymerization increases the drying rate. For example, product D above described, when heated at 295° C. for 2.5 hours, increased in body to about Z-5 and had a drying time of only 2 hours.

The process herein comprises heating the hydroxylated glyceride oil with from 0.2% to 10% of a mixture of a phosphoric acid and boric acid or with the same proportion of preformed finely divided boron phosphate until evolution of water vapor substantially ceases. The temperature is between 200° and 300° C. and preferably at between about 240° C. and 260° C., since the reaction is easily controlled in the latter temperature range. Heating of the mixture may be carried out under atmospheric pressure or under vacuum and preferably in an atmosphere of carbon dioxide or other inert gas. Rapid agitation during the reaction as by a mechanical stirrer is of advantage in speeding up the elimination of water and keeping the catalytic mass in suspension. If an oil of high viscosity is desired, heating is continued after evolution of water has ceased. The process may also be carried out on castor oil fatty acids.

In place of orthophosphoric acid there may be used meta or pyrophosphoric acid or phosphoric anhydride, and in place of orthoboric acid there may be used boric anhydride, borax, ammonium borate, etc. While the ratio of phosphoric acid to boric acid is preferably such as to form boron phosphate without excess of either reactant, it may be remarked that the amount of phosphoric acid in the mixture of acids may range from about ⅓ to 3 moles per mole of boric acid. As noted above, the phosphoric and boric acids may be added separately in these relative proportions or they may first be heated together to form a boron phosphate-containing mass and added in finely divided form. The heated mixture of acids may be purified by washing with water or used in the crude form and possibly containing some free boric or phosphoric acid. More complex boron phosphates may be made from halides and salts of the acids.

The crude products from the treatment of hydroxylated oils herein described are turbid unless the minimum amount of catalyst is used. Clarification may occur on long standing but is preferably brought about in other ways. One method is by filtration in the presence of a filter-aid, the filtration preferably being preceded or followed by washing with water, since this results in a lowering of the acid number. Another method is to extract the oil with a lower alcohol (preferably with aqueous alcohol of about 85% alcoholic content). Subsequently the treated oils are heated to remove residual solvent.

The following examples illustrate the detailed practice of the invention, such examples being given by way of illustration only, and not as a limitation. In these examples, amounts of ingredients are by weight.

Example 1

A reactor equipped with stirrer, gas-inlet tube, thermometer and distillation condenser, is charged with 200 parts of U. S. P. castor oil, 3 parts of orthoboric acid and 3 parts of 85 per cent orthophosphoric acid. The reactants, subjected to rapid stirring and a stream of carbon dioxide, are heated by direct burner heat in 0.3 hour to 245° C. and held at 245–250° C. for 0.7 hour. In the process of dehydration 10.7 parts of water are expelled. When admixed with 0.25 per cent lead and 0.05 per cent manganese (as naphthalenates) the oil dries to a hard non-tacky film in 5.5 hours. It is further noted that the oil as produced is turbid. This turbidity is removed by washing with water at 80° C., desolventing under aspirator vacuum on a boiling water bath and filtering. After the treatment the oil is clear and has an acid number of 9, Gardner viscosity E, and a Lovibond color of 2 Yellow. When the clarified oil is admixed with 0.25 per cent lead and 0.05 percent manganese added as naphthenates, it dries to a firm tack-free film in 5.5 hours at 24° C. A commercially available dehydrated castor oil (Isoline) of viscosity G-H similarly tested along with the experimental oil dries to a tack-free film in 6 hours.

When the clarified oil is heated for 3.3 hours at 295° C. (exposed to the atmosphere) it attains a Gardner viscosity of approximately Z–5. The bodied oil is clear and has an acid number of 1.0 and a Lovibond color of 25 Yellow. In the presence of 0.25 per cent lead and 0.05 per cent manganese added as naphthenates, it dries to a non-tacky film in 2.5 hours at room temperature.

Example 2

A reactor equipped with stirrer, thermometer, gas-inlet, and distillation condenser, is charged with 830 parts of U. S. P. castor oil, 12.5 parts of 85 per cent orthophosphoric acid, and 16.5 parts of boric acid. When the reactants, subjected to rapid stirring and a stream of carbon dioxide, are heated by direct burner heat to 260° C. in 0.5 hour and held at 260° C. for one hour, 48 parts of water are expelled. The resulting oil, after being washed 5 times with a solution containing 85 parts of ethanol and 15 parts of water by volume, desolvented, and filtered, is clear and has the following constants: Hanus iodine number 131, acid number 5.0, Lovibond color 5 Yellow, and Gardner viscosity F. When the oil is admixed with 0.25 per cent lead and 0.05 per cent manganese (added as naphthenates) it dries to a lustrous, hard, tack-free film in 4.5 hours at room temperature.

Example 3

Ten parts of orthoboric acid and 10 parts of 85 per cent orthophosphoric acid are mixed thoroughly to a pasty consistency and heated for 20 minutes at approximately 300° C. In the course of heating, 11.5 parts of volatile matter are expelled. The resulting hard, light gray mass is crushed to a fine powder, and 10 parts of this powder, together with 200 parts of U. S. P. castor oil are charged into a reactor equipped with stirrer, thermometer, gas-inlet tube and distillation condenser. The reactants, subjected to rapid stirring and a stream of carbon dioxide, are heated by direct heat to 230° C. and held at 230–240° C. for 0.4 hour. In the course of reaction, 9 parts of water are expelled. The resulting oil, after being washed 5 times with a solution containing 85 parts of ethanol and 15 parts of water by volume, and desolvented and filtered, is clear, and has the following physical and analytical values: acid number 2.2, Lovibond color 14 Yellow, and Gardner viscosity E. When admixed with 0.25 per cent lead and 0.05 per cent manganese (added as naphthenates) the oil dries to a hard, tack-free film in 3.9 hours at room temperature.

Example 4

Twenty parts of orthoboric acid and 10 parts of 85 per cent orthophosphoric acid are thoroughly mixed and then heated for 20 minutes at approximately 300° C. In the course of reaction 11.5 parts of volatile matter are evolved. The resulting light gray mass is crushed to a fine powder, and 6 parts of this powder, together with 200 parts of U. S. P. castor oil are charged into a reactor equipped with stirrer, thermometer, gas-inlet tube, and distillation condenser. While being subjected to rapid stirring and a stream of carbon dioxide, the reactants are heated by direct heat to 245° C. in 0.5 hour, and held at 245–250° C. for 0.5 hour. In the course of reaction 8 parts of water are evolved. The dehydrated oil, after being washed 5 times with a solution containing 85 parts of ethanol and 15 parts of water by volume, and then desolvented and filtered, has the following physical and analytical values: Hanus iodine number 137, acid number 1.8, Lovibond color 6.5 Yellow, and Gardner viscosity E. When the clarified oil is admixed with 0.25 per cent lead and 0.05 per cent manganese (added as naphthenates) it dries to a hard, glossy, tack-free film in 3.3 hours at room temperature.

Example 5

Twenty-three parts of 85 per cent orthophosphoric acid and 12.4 parts of orthoboric acid (1–1 molar ratio) are mixed thoroughly, evaporated to dryness, and heated at red heat for 3 hours. The resulting white earthly product is crushed to pass an 80 mesh sieve. Six parts of the powdered product, together with 200 parts of U. S. P. castor oil are charged into a reactor equipped with stirrer, thermometer, gas-inlet tube, and distillation condenser. The reactants, subjected to rapid stirring and a stream of carbon dioxide, are heated by direct heat to 250° C. in 0.2 hour and held at 250° C. for 0.7 hour. In the course of reaction, 6.0 parts of water are expelled. The product of the reaction is a hazy oil and is clarified by filtration. The clarified oil has the following analytical and physical values: Gardner viscosity E. Lovibond color 8 Yellow, and acid number 18.3. When admixed with 0.25 per cent lead and 0.05 per cent manganese, added as naphthenates, the oil dries to a firm tackfree film in 6.5 hours at 25° C.

A portion of the dehydrated, filtered oil is heated in an open beaker for 2.5 hours, at 295° C., without agitation. The bodied oil is clear and has a viscosity of approximately Z-5, an acid number of 1.0 and a Lovibond color of 40 Yellow. In the presence of 0.25 per cent lead and 0.05 per cent manganese (added as naphthenates) the oil dies to a firm, tack-free film in 2.0 hours at room temperature.

A portion of the clarified oil is mixed with ester gum in proportion for a 25-gallon varnish base, and heated at 295° C. It is found that this experimental oil-ester gum base bodies more rapidly and is less subject to darkening at 295° C. than a control varnish base similarly formulated, but made with a commercially available dehydrated castor oil of G-H viscosity. The varnish bases are diluted with varsol to a varnish containing 50 per cent solids. When films of the experimental varnish are baked or air-dried in the presence of drier they are harder and have better alkali resistance and water resistance than similarly prepared films of the control varnish.

Example 6

Two parts of orthoboric acid and 1 part of 85% orthophosphoric acid are thoroughly mixed into a paste and heated for 20 minutes at approximately 300° C. The product is crushed to a fine powder and 10 parts of this powder together with 400 parts of U. S. P. castor oil are charged into a reactor equipped with stirrer, thermometer, gas-inlet tube, and distillation condenser. Rapid stirring and a stream of carbon dioxide are applied. The reactants are brought by direct heat to 245° C. in 0.5 hour and 10 more parts of the powdered catalyst are introduced. The reactants are held at 245-250° C. for 0.5 hour. In the course of reaction 14.3 parts of water are evolved. The product is a pale, turbid oil having a Gardner viscosity of F, and an acid number of 23. After being washed 5 times with a solution containing 85 parts of denatured ethanol and 15 parts of water by volume, desolvented under vacuum at 90° C., and filtered, the oil is clear and has the following physical and analytical values: Gardner viscosity E, acid number 2.0, Lovibond color 7 Yellow, and Hanus iodine number 142. When the clarified oil is admixed with 0.25 per cent lead and 0.05 per cent manganese (added as naphthenates) it dries to a hard non-tacky film in 3.0 hours, at room temperature.

I claim:
1. The process of making a low viscosity drying oil from castor oil which comprises mixing castor oil with from 0.2% to 10% of boric and phosphoric acids, the phosphoric acid ranging from ⅓ to 3 moles per mole of boric acid, and heating the mixture at between 200° C. and 300° C. until evolution of water vapor substantially ceases.
2. The process of making a low viscosity drying oil from castor oil which comprises mixing castor oil with from 0.2% to 10% of boron phosphate and heating the mixture at between 200° C. and 300° C. until evolution of water vapor substantially ceases.
3. The process which comprises reacting, at between about 200° C. and 300° C., castor oil with from 0.2 to 10% of a mixture of boric and phosphoric acids in proportions to form boron phosphate whereby the oil is dehydrated and converted to a low-viscosity drying oil.
4. The process of dehydrating castor oil to a drying oil of low viscosity which comprises heating said oil at between about 200° C. and 300° C. with from 0.2% to 10% of boron phosphate.

JOHN B. RUST.

REFERENCES CITED

The following references are of record in the file of this patent:

UNITED STATES PATENTS

| Number | Name | Date |
| --- | --- | --- |
| 2,317,362 | Colbeth | Apr. 27, 1943 |

FOREIGN PATENTS

| Number | Country | Date |
| --- | --- | --- |
| 508,516 | Great Britain | July 3, 1939 |